United States Patent
Predmore, II

(10) Patent No.: US 10,979,662 B2
(45) Date of Patent: Apr. 13, 2021

(54) METHOD AND SYSTEM TO INHIBIT SHUTDOWN OF MOBILE RECORDER WHILE DOWNLOAD IS ACTIVE

(71) Applicant: SEON DESIGN (USA) CORP., Bellingham, WA (US)

(72) Inventor: Thomas J. Predmore, II, Salem, OR (US)

(73) Assignee: SEON DESIGN (USA) CORP., Coquitlam (CA)

(*) Notice: Subject to any disclaimer, the term of this patent is extended or adjusted under 35 U.S.C. 154(b) by 0 days.

(21) Appl. No.: 16/625,352

(22) PCT Filed: Jun. 21, 2018

(86) PCT No.: PCT/US2018/038722
§ 371 (c)(1),
(2) Date: Dec. 20, 2019

(87) PCT Pub. No.: WO2018/237123
PCT Pub. Date: Dec. 27, 2018

(65) Prior Publication Data
US 2020/0336695 A1    Oct. 22, 2020

Related U.S. Application Data

(60) Provisional application No. 62/523,830, filed on Jun. 23, 2017.

(51) Int. Cl.
*H04N 5/77* (2006.01)
*G07C 5/08* (2006.01)
(Continued)

(52) U.S. Cl.
CPC .......... *H04N 5/77* (2013.01); *G07C 5/0866* (2013.01); *H04N 7/18* (2013.01)

(58) Field of Classification Search
CPC .......... H04N 9/8205; H04N 5/77; H04N 5/76; H04N 7/18; G07C 5/008; G07C 5/0866
(Continued)

(56) References Cited

U.S. PATENT DOCUMENTS 6,217,478 B1 * 4/2001 Vohmann ............ F16H 61/6648
477/50
2004/0008255 A1   1/2004 Lewellen
(Continued)

OTHER PUBLICATIONS

The International Search Report of the International Searching Authority for International Application No. PCT/US2018/038722.

*Primary Examiner* — Robert Chevalier
(74) *Attorney, Agent, or Firm* — Leech Tishman Fuscldo & Lampl; Michael D. Lazzara

(57) ABSTRACT

A method and system for inhibiting shutdown of a mobile data recorder of a mobile digital audio/video recording (MDVR) system in a vehicle while a download is active. The method including identifying if a data download is currently in process and the vehicle is in an OFF powered state and ascertaining if at least one of whether the data download is complete, and a data network connection for conducting the download is not available, and executing a shutdown of the MDVR system. Otherwise, inhibiting shut down of the MDVR system, determining if a selected condition for maintaining the inhibiting is false and executing a shutdown of the MDVR system, and repeating the ascertaining, inhibiting, and determining.

22 Claims, 2 Drawing Sheets

(51) Int. Cl.
*H04N 7/18* (2006.01)
*H04N 5/93* (2006.01)

(58) Field of Classification Search
USPC ........ 386/224, 228, 229, 248, 263, 278, 326
See application file for complete search history.

(56) References Cited

U.S. PATENT DOCUMENTS

| | | |
|---|---|---|
| 2005/0243171 A1* | 11/2005 | Ross, Sr. .......... G08B 13/19645 348/148 |
| 2007/0035632 A1 | 2/2007 | Silvernail et al. |
| 2008/0043104 A1 | 2/2008 | Silveranil et al. |
| 2008/0077290 A1 | 3/2008 | Weinmann et al. |
| 2015/0089489 A1* | 3/2015 | Sarkar .................... G06F 8/656 717/173 |
| 2015/0281651 A1 | 10/2015 | Kaushik et al. |

* cited by examiner

METHOD AND SYSTEM TO INHIBIT SHUTDOWN OF MOBILE RECORDER WHILE DOWNLOAD IS ACTIVE

TECHNICAL FIELD

The present invention relates generally to digital video recording systems, and more specifically, to mobile digital video recording systems as are commonly employed in transit systems.

BACKGROUND

Video and data surveillance systems are commonly used by individuals, businesses, and governments to remotely monitor activity. Traditional video, audio and data collection systems commonly employ locally installed systems that store surveillance information locally and they operate with static software. These local systems are referred to as a standalone digital video recorder (DVR). A typical standalone DVR system integrates audio/video (A/V) data systems data, status, and metadata into a single data stream, which is then stored together in a single database or data container. Consequently, the entire recorded A/V data file is downloaded for analysis and storage.

Advances in technology have allowed for combining the components of a traditional video, audio and data collection system into a single, mobile package. This mobile package is typically referred to as a mobile DVR (MDVR) system. These MDVR systems may be employed as surveillance systems on moving vehicles, such as buses, or as body-worn recording systems, such as a law enforcement body-camera system. These traditional MDVR systems may store the integrated audio/video (A/V) data and data together in a single database which results in storing and analyzing vast amounts of data. Consequently, a vast amount of data must be streamed or downloaded before users can access or analyze certain data. Typically data is downloaded to a central control station and database via WiFi® or other wireless techniques once the vehicle is at a central depot. When vehicle ignition turns OFF, the recorder turns off after a programmed time delay. If a download is active, it is interrupted and may not resume until the recorder is powered ON and the Wi-Fi connection reestablished. If the vehicle then departs and the Wi-Fi connection is not available, the download cannot resume and may be lost. These activities limit opportunity to complete data download.

SUMMARY

Described herein in at least one embodiment is a method and system for inhibiting shutdown of a mobile data recorder of a mobile digital audio/video recording (MDVR) system in a vehicle while a download is active. The method includes identifying if a data download is currently in process and the vehicle ignition is in an OFF powered state and ascertaining if at least one of whether the data download is complete and a data network connection for conducting the download is not available. Otherwise, inhibiting shut down of the MDVR system, determining if a selected condition for maintaining the shutdown inhibit is false and executing a shutdown of the MDVR system.

In addition to one or more of the features described above or below, or as an alternative, further embodiments include that the identifying includes determining that a data controller on the vehicle has established a network connection between a data container on the vehicle and a recorded media control module at a depot or station and that the vehicle is at a location where establishing the network connection is possible.

In addition to one or more of the features described above or below, or as an alternative, further embodiments include that the ascertaining a network is not available is based on a selected number of attempted connections to the data network within a predetermined duration.

In addition to one or more of the features described above or below, or as an alternative, further embodiments include that the selected number of attempted connections is up to 1000 and the predetermined duration is in a range of one minute to one hour.

In addition to one or more of the features described above or below, or as an alternative, further embodiments include that the ascertaining a network is not available is based on determining that a data rate being achieved on the data network is less than a selected threshold.

In addition to one or more of the features described above or below, or as an alternative, further embodiments include that the selected threshold is in the range of at least 1 Mb/s to 10 Mb/s.

In addition to one or more of the features described above or below, or as an alternative, further embodiments include that the inhibiting shutdown is based on an existing predetermined delay.

In addition to one or more of the features described above or below, or as an alternative, further embodiments include that the selected condition for maintaining the inhibiting includes at least one of a selected time duration from when the vehicle is powered off, and a selected time duration in addition to a preexisting delay in shutdown of the MDVR system.

In addition to one or more of the features described above or below, or as an alternative, further embodiments include that the inhibiting is prevented if the download is complete prior to a predetermined delay in shut down of the MDVR system.

In addition to one or more of the features described above or below, or as an alternative, further embodiments include that the inhibiting produces a savings of energy and bandwidth compared to a fixed shut of delay.

Also described herein in an embodiment is a mobile digital audio-visual recording (MDVR) system, The MDVR system including an audio/video (A/V) input module configured to generate media data including at least one of audio, video and a metadata interface including at least one channel configured to transfer metadata thereon, and a data collection module including at least one data container the data collection module in signal communication with the metadata interface and the A/V interface, and configured to receive the metadata and the media data, wherein the data collection module stores at least one of the metadata and the media data in the data container. The data collection module is configured to execute the method of inhibiting shutdown of the MDVR system in a vehicle while a download is active.

In addition to one or more of the features described above or below, or as an alternative, further embodiments include that the metadata is at least one of vehicle identification data; braking data, acceleration data, brake pedal/accelerator pedal position data, speed data, actuator state data, voltage/current data; location data; global-positioning satellite data; digital tags, and time stamps.

In addition to one or more of the features described above or below, or as an alternative, further embodiments include a recorded media control module configured to process the media data stored in the second data container.

In addition to one or more of the features described above or below, or as an alternative, further embodiments include that the recorded media control module is configured to perform at least one of A/V data playback, sound adjustment, image rewind, image fast-forwarding, and image zooming.

In addition to one or more of the features described above or below, or as an alternative, further embodiments include a network connection between a data container on the vehicle and a recorded media control module at a depot or station and that the vehicle is at a location where establishing the network connection is possible.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Figure 1:
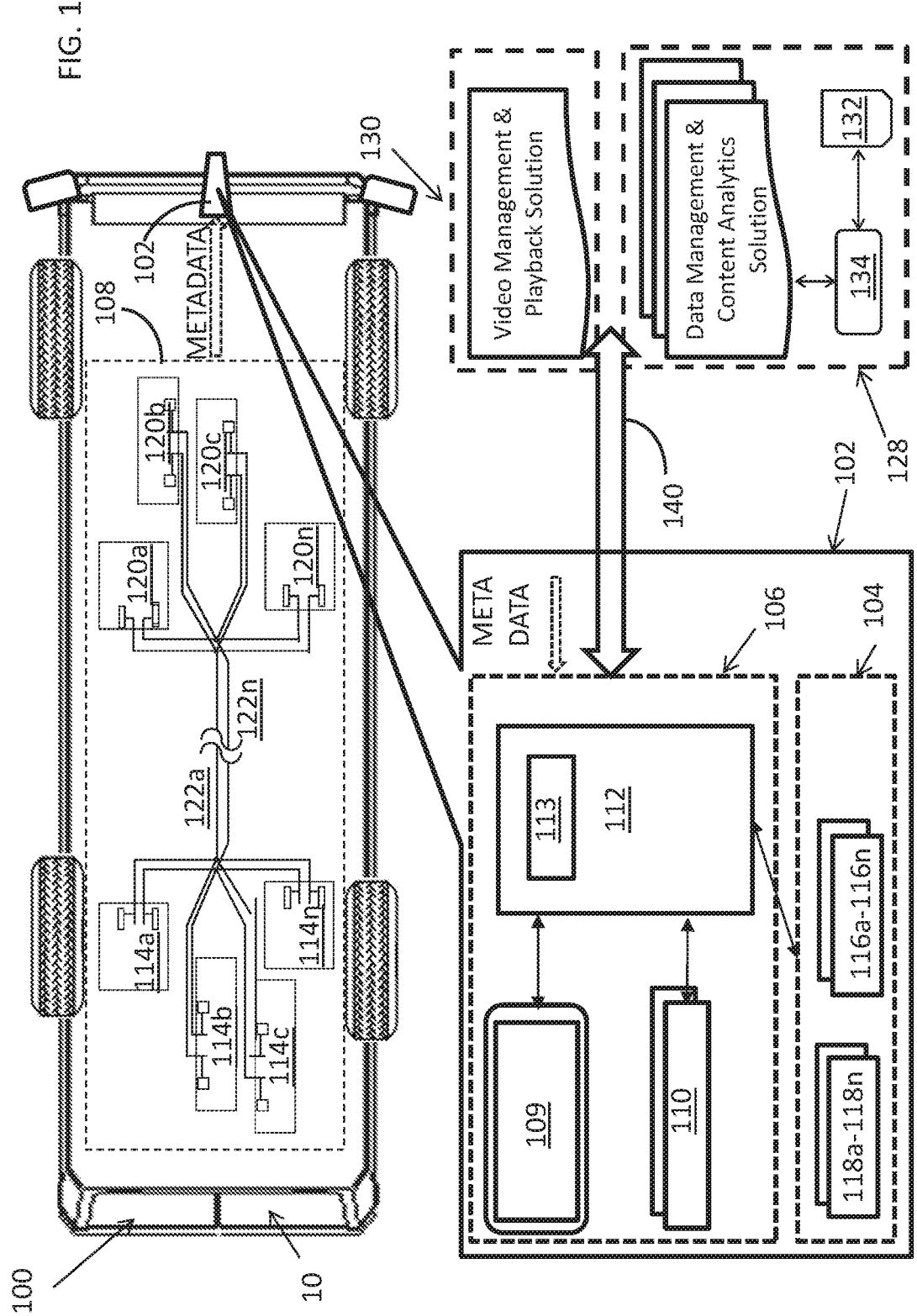
FIG. 1 is a top view of a mass transit vehicle including a MDVR system according to a non-limiting embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Various non-limiting embodiments provide a mobile audio/video recording (MDVR) system configured to collect audio data, visual data, and other data of interest (i.e., (metadata), extract the data of interest from the audio and visual data, and store the data of interest in a first memory unit that is separate and independent from a second memory unit used to store the audio-visual data. In at least one embodiment, a MDVR system includes an A/V input module, a metadata interface, and a data collection module. The A/V input module collects an A/V data such as, for example, audio-visual surveillance. The metadata interface includes an electronic communication network interface such as a controller area network (CAN) bus or a Bluetooth interface, for example, capable of delivering message-based metadata. The MDVR system therefore may provide various data management & content analytics solutions based on the metadata which include analyzing and processing the metadata and A/V data.

Turning now to FIG. 1, a vehicle 10 in FIG. 1 includes a mobile digital video recording (MDVR) system 100, which during normal operation captures and records audio-visual segments using an onboard MDVR apparatus 102. The MDVR apparatus 102 includes an audio and/or video (A/V) input module 104, a data collection module 106, and at least one metadata interface 108.

In at least one embodiment, the A/V input module 104 is separated from the data collection module 106. In this manner, the A/V input module 104 may be at different location than the data collection module 106. In another embodiment, the A/V input module 104 and the data collection module 106 are integrated. The A/V input module 104 may include or be operably connected to one or more media input devices including, but not limited to, one or more images sensors 118a-118n (e.g., cameras) and one or more audio sensors 116a-116n (e.g., microphones). Image sensors 118a-118n and audio sensors may also be integrated. The media input devices may be installed at various locations throughout the vehicle 10. In an embodiment, the image sensors118a-118n and audio sensors 116a-116n may be integrated.

The data collection module 106 may include one or more data container 110 (two are shown), and a data collection controller 112. The data container 110 can be any suitable electronic medium for storing data files such as a recordable disc, solid state memory, flash drives, and the like. The data that may be stored includes, but is not limited to, video data, audio data, and/or other data of interest (i.e., metadata) such as vehicle status and state indicators, operational states, digital tags, time stamps, GPS data, etc. In at least one embodiment, a data container 110 may include two or more separate data files stored in a single data container 110 or may include two separate and individual recordable storage mediums.

In at least one embodiment, A/V input module 104 and the metadata interface 108 simultaneously collect and output the media data and the metadata, respectively to the data collection module 106. In one embodiment, the data container 110 stores only the metadata, while a second data container 110 stores media data such as, for example, the audio data and the video data. In addition, the data container 110 stores various vehicle data of interest (i.e., vehicle metadata). The vehicle metadata includes, but is not limited to, vehicle operation data, vehicle communication bus data (e.g., data frames), door opening/closing state, braking data, acceleration data, brake pedal/accelerator pedal position data, speed data, actuator state data, voltage/current data, switch/relay states, other general purpose input/outputs (GPIOs), etc. The metadata may also include all user input and device output information. In another embodiment, all of the data is collected and saved to a single storage container 110.

In at least one embodiment, the data container(s) 110 is/are independently removable from the MDVR apparatus 102. The removed data container 110 may be reinserted into the MDVR apparatus 102, moved to a different vehicle 10, or replaced by a different data container 110. During operation of the vehicle 10, the MDVR apparatus 102 and data container 110 may work in conjunction to act as a surveillance system for the vehicle 10. The vehicle 10, as shown by way of a non-limiting example, is a public bus 10, transit vehicle, or fleet vehicle, but can be any other suitable type of transportation vehicle such as a train, aircraft, etc.

With continued reference to FIG. 1, the data collection controller 112 is in signal communication with the data containers 110 via first and/or second data channels. The data collection controller 112 may be constructed as a hardware processor operatively connected to or including memory 113. The memory 113 includes instructions recorded thereon that, when read by the processor in the data collection controller 112, causes the processor to perform various functions described in greater detail below.

The data collection module 106 is also in signal communication with the metadata interface 108. The metadata interface 108 may itself comprise of one or more interfaces configured to deliver metadata to the data collection module 106. The metadata interface 108 may operate according to various wired or wireless protocols and communication interfaces 122a-122n including, but not limited to, Bluetooth, radio-frequency identification (RFID), controller-area network (CAN) bus, serial data interfaces, a Ethernet interface, wireless interfaces configured to electrically communicate with a remotely located wireless device that provides local metadata or locally generated data of interest etc. For example, a first wired serial-based metadata interface 122a may deliver locally generated vehicle system metadata (e.g., data generated by a general purpose input/output), while another wired or wireless metadata interface 122n may deliver metadata generated by one or more data sources other than the vehicle data (i.e., the data transferred on the wired metadata interface 122a-122n). In at least one embodiment, the metadata interface 108 operates according to a message-based protocol such as, for example, a controller-area network (CAN) bus 108. The CAN bus 108 includes a single or dual-line that communicates various messages or data frames between one or more systems, sensors and/or actuators generally referred to as CAN nodes 114a-114n.

Accordingly, in one embodiment, the data collection controller 112 is capable of distinguishing the A/V data from the metadata received from the metadata interface 108. In this manner, the data collection controller 112 may store the metadata received from the metadata interface 108 in a first data container 110 while separately storing the A/V data in a second data container 110b. The data collection module 106 may itself act as a node, and therefore, is capable of receiving messages output by other CAN nodes 114a-114n in addition to the A/V data provided by the A/V input module 104. In another embodiment, the hardware controller 112 may receive a single data stream integrated with the metadata and the media data, extract the metadata from the data stream, and then deliver the extracted metadata to the data container 110.

The metadata interface 108 may further include one or more general purpose input/outputs (GPIOs) 120a-120n, or physical node/terminals 120a-120n. The GPIO channels 120a-120n may be in electrical communication with various actuator, relays, etc., that output data of interest including, but not limited to, sensor output signals, actuator state signals, voltage/current values, and switch/relay states. The metadata interface 108 may communicate with the various CAN nodes 114a-114n and the GPIOs via d122a-122n The data collection module 106 may include a user-interface (UI) 109. The UI 109 is configured to receive one or more inputs provided by a user, service technician, and the like, and output one or more status alerts. The UI 109 may be manipulated to input a command that controls the operating mode of the data collection module 106 as described in greater detail below. In at least one embodiment, the user may manipulate the UI 109 (i.e., input one or more commands) to operate the data collection module 106 in a variety of modes. In one embodiment, for example, the user may manipulate the UI 109 to operate the data collection module 106 in either a buffer mode or full-record mode. When operating in the buffer mode, the MDVR apparatus 102 captures data, but A/V data and/or metadata is stored for only a predetermined duration (e.g., 30 seconds) before being automatically deleted. When, however, operating in the full-record mode the A/V data and the metadata are stored in one or more of the data containers 110. Both A/V data and metadata stored in response to activating the full-recording mode may not be deleted by the user. The UI 109 may also provide an alert such as a sound alert and/or graphical alert, for example, which informs the user of the current operating mode. (all user input and device output information is also stored as metadata).

With further reference to FIG. 1, the MDVR system 100 further includes a data analytics module 128 and a recorded media control module 130. In an embodiment, the data analytics module 128 and a recorded media control module 130 might be at a fixed location, such as a station or depot, though it need not be. The data analytics module 128 is in signal communication with the data collection module 106. The data analytics module 128 includes a graphical user interface (GUI) 132 and a hardware controller 134 (including memory). The data analytics module 128 is configured to generate one or more data management and content analytics solutions in response to executing one or more analytics operations on the data stored in the data container 110. In one embodiment the data analytics module 128 and a recorded media control module 130 download all the data recorded on the data container(s) 110 for subsequent analysis and review.

In another embodiment, the analytics operations include, but are not limited to, querying a specific type of data or metadata (e.g., data of interest, data regarding data of interest) from one data container 110, downloading only a specific type of data from the data container 110. Another analytics solution includes providing one or more users with real-time access to only the data stored in one data container 110. Therefore, only a low amount of data is necessary to be streamed to provide users with real-time access to the metadata, as opposed to streaming large amounts of data necessitated when streaming media data integrated with the metadata. Accordingly, the metadata may be obtained before ever having played-back or replayed the media data. For example, a user may review the metadata first, without the need to view the media data, and then subsequently view the media data, if necessary, to corroborate the metadata and/or obtain additional audio and/or visual data related to the metadata data. Complete data downloads include large amounts of data and require significant time and bandwidth. If downloads are required for many vehicles, the time required to complete downloads impacts completing other operations on the vehicle 10.

In another embodiment, the recorded media control module 130 is configured to process the media data stored in another data container 110. For example, the recorded media control module 130 is configured to perform at least one of A/V data playback, sound adjustment, image rewind, image fast-forwarding, and image zooming. The recorded media control module 130 is also capable of performing metadata analysis originating from collected A/V media, however, the recorded media control module 130 may perform the analysis only after the A/V data stream has been downloaded and a pre-process or extraction has occurred.

Continuing with FIG. 1, in operation when the vehicle 10 returns to the station, depot, it may be desirable, and in certain instances required to download the contents of the data containers 110 for review. For example, in the instance of an incident or an accident with the vehicle 10. In an embodiment, the recorded media control module 130 of the MDVR system 100 is configured to process the media data stored by the data collection controller 112 on one or more of the data container(s) 110. For example, the recorded media control module 130 is configured to perform at least one of A/V data playback, sound adjustment, image rewind, image fast-forwarding, and image zooming. The recorded media control module 130 is also capable of performing metadata analysis originating from collected A/V media, however, the recorded media control module 130 may perform the analysis only after the A/V data stream has been downloaded and a pre-process or extraction has occurred. When the vehicle 10 has returned to a station or depot the download of data is initiated. In an embodiment the download is automatically initiated. The data collection module 106 detects the network communication 140 (e.g., a depot WiFi® or other data connection) with the data analytics module 128 and recorded media control module 130 and begins downloading the saved data from the data containers 110a and 110b. When the ignition of the vehicle 10 is turned OFF, data collection module 106 and particularly the data container 110 is configured to turn off after a programmed time delay. If a download of media data and metadata is active, when the predefined time delay is expires, the download is interrupted. In some existing MDVR systems, the download may be configured to continue when the MDVR system 100 is powered ON again (for example the next day of service). However, if the vehicle 10 then departs the depot or station or the Wi-Fi® or network connection is not available the download will be interrupted and may be lost. These activities limit opportunity to complete data download.

To address these concerns, in an embodiment, the preselected delayed shutdown MDVR system 100 on the vehicle 10 after the vehicle power is switched OFF is inhibited for selected durations and conditions. In an embodiment, the shutdown function of the MDVR system 100 and in particular the data controller 112 is inhibited during any active download of data from the data container 110. Under these conditions, this function enables active download to continue until completion even when vehicle ignition is OFF and programmed time delay for shut down of the MDVR system 100 has expired to ensure the download is completed and the desired data is available for analysis. Upon completion of the download, the MDVR system 100 and data container 110 shuts off.

The shutdown functionality of the MDVR system 100 may include various rules and selected conditions, which may be individually and optionally enabled and configured to automatically terminate the active download and shut down the MDVR system 100 and data container 110. In one embodiment, the inhibit time (inhibiting the standard delay for system shut down) may be limited to a maximum duration. For example, a selected maximum total duration, a selected additional duration beyond the abovementioned preselected delay in MDVR system shutdown following shut down of the vehicle 10. In one embodiment the maximum duration is 30 minutes and the inhibit time is 30 minutes. The maximum total duration, and/or selected additional duration may be determined based on expected system power consumption during the download. It should be appreciated that if available, the data controller may monitor the power consumption of the MDVR system 100 during the download to ensure that the consumptions is not excessive and does not exceed predefined limitations on current/power consumption. Such limitations ensure that the batteries on the vehicle are not depleted as a result of the downloading of data.

In another embodiment, the inhibiting of the standard delay for MDVR system shut down may be limited based on connectivity to the network 140. For example, with a Wi-Fi® network, the inhibit function may be limited based on a limited maximum number of permitted reconnection attempts. If the connection is intermittent, or unreliable transferring the data is not desirable. In an embodiment the data controller 112 might keep track of a selected number of network connection attempts and the duration of attempts. If the number of attempts, within a selected duration is exceeded or exceeded within a selected duration, the inhibit function could be limited. In an embodiment, a number of permitted connection/reconnection attempts is 1000 and a selected duration is five minutes. In yet another embodiment, as few as 100 repeated connection attempts may be employed and durations as short as second and as long as hours may be permitted.

In another embodiment, data transfer rates below a selected lower threshold may also be treated as a justification to not inhibit the shutdown, or the low data rate could be treated as a network disconnect, where low data rates or exceeding a selected number of connection attempts could be considered a connection attempt for the purposes of determining if a threshold number of connection attempts has been exceeded. In an embodiment, data rates as low as 1 Mb/sec or up to 10 Mb/s may be sufficient to permit shutdown. In another embodiment, if the download is completed early, that is, before the pre-existing time delay has lapsed, the MDVR system 100 could be shut down, as there is no need to keep it in operation once the download is complete.

Advantageously the described embodiments offer improved control over the predetermined shutdown of the MDVR system 100 and the data container(s) 110 if a download of data is active. This increases opportunity to complete download activity sooner and in selected instances would save battery power and life in the vehicle 10. For example in selected instances, the shutdown may be instituted sooner than the existing preselected duration after the vehicle 10 is set to the OFF state (e.g., ignition off). This feature would save energy and reduce unnecessary power drain on the battery. Moreover, in a depot or station setting where there may be many vehicles employing the network 140 for bandwidth, communication can be improved. For example, if a selected vehicle 10 either cannot complete its download, or has already completed its download, then an advance shut down of one MDVR system 100 on one vehicle 10 would make potentially further bandwidth available for the other MDVR systems 100 attempting to complete their downloads. Features offering quicker completion of downloads are highly desirable for in mobile recording systems and save time for operators. For example, in an embodiment, a percentage savings can be inferred on both energy consumption and bandwidth by having the data analytics module 128 monitor the smart shutdown time (with inhibit function of the described embodiments) vs. fixed shutdown delay of conventional systems. The time savings expressed as a percentage should apply equally to energy and bandwidth.

Fixed shutdown time is always the same value and can be calculated—no monitoring required. The shutdown time of the described embodiments may be longer or shorter based on system activity. For example in an embodiment, time values are monitored by data analytics module 128, and then the data analytics module 128 queries the MDVR system 100 for fixed shutdown values and uses these to establish a baseline fixed shutdown time for comparison. The data analytics module 128 continuously monitors and records actual shutdown durations for each recorder. Data analytics module 128 compares shutdown times of the described embodiments against the fixed times. Saved time correlates to improvements in saved energy and bandwidth. Over time, the data analytics module 128 periodically (daily/weekly/monthly/yearly) produces a report showing percent saved.

Figure 2:
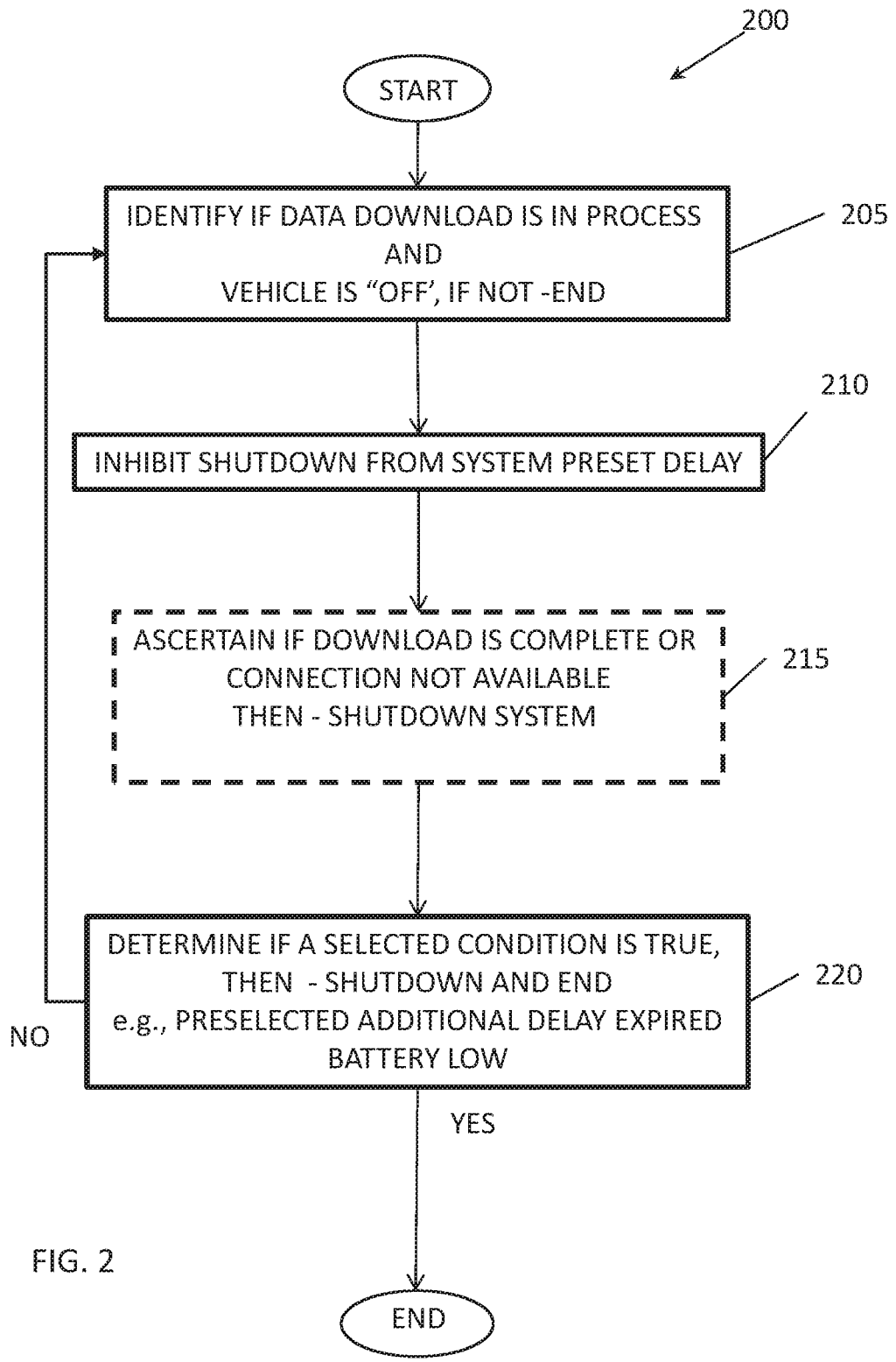
FIG. 2 is a flow diagram illustrating a method inhibiting shutdown of a mobile data recorder of a mobile digital audio/video recording (MDVR) system in a vehicle while a download is active according to a non-limiting embodiment.

Turning now to FIG. 2, a method 200 of inhibiting shutdown of a MDVR system 100 separately while downloading data (e.g., audio and/or visual data, metadata) gathered by the MDVR system 100 is illustrated according to a non-limiting embodiment. In an embodiment, the method 200 may be implemented in software, embodied in memory as a non-transitory machine-readable storage medium readable by a processing circuit and storing instructions for execution by the processing circuit for performing a method. In the embodiment, the method is executed on data controller 112 as part of the data collection module 106. It will be appreciated that the methodology could be implemented in other on vehicle 10 processors systems and the like. In addition the method could be implemented in the station or depot based recorded media control module 130 under selected conditions.

The method begins at operation 205, in determining if stored data from the data container(s) 110 such as audio data, visual data, for metadata is being downloaded and the vehicle 10 ignition is OFF. If this is true, the process 200 continues, otherwise the method ends because the conditions for performing it are not satisfied or the download has completed. At process step 210 the method 200 continues with inhibiting the shutdown of the MDVR system 100. This ensures that the downloading of the data continues uninterrupted. Continuing now to process step 215, the method 200 continues with determining if the criteria for inhibiting the shutdown are still present. For example is the data download complete if so, the MDVR system 100 may then elect to shut down immediately. As stated earlier, this approach conserves power and facilitates providing additional bandwidth on the network for other MDVR systems to complete their download. Another condition would be if the connection is not available for a selected duration, or the data transfer rate is too low for satisfactory data transfer. Continuing with the method 200, the data controller 112 then determines if any of the selected conditions for inhibiting the shutdown are also present as depicted at process step 220. For example the additional shut down delay has expired, or the battery for the vehicle 10 has been depleted beyond a selected amount. If these conditions are satisfied the MDVR system 100 is shut down, otherwise the method 200 reverts to step 205 to repeat the conditions. It should be appreciated that while the embodiments described herein are provided as examples of some conditions that may trigger inhibiting or delaying shutdown, other conditions are possible. In fact, any rule a user finds desirable within the use limitation of determining when the inhibit shutdown should remain active could be employed As described in detail above, various embodiments the technical effects and benefits of embodiments relate to providing a mobile audio/video recording (MDVR) system 100 configured to collect audio data, visual data, and other data of interest (i.e., metadata), and permit uninterrupted downloads of the data under selected conditions. Accordingly, the MDVR system 100 may provide for improved data management within defined power constraints and provides a more mobile robust data recording and download solutions, particularly for transit operators.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. The corresponding structures, materials, acts, and equivalents of all means or step plus function elements in the claims below are intended to include any structure, material, or act for performing the function in combination with other claimed elements as specifically claimed. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of inhibiting shutdown of a mobile data recorder of a mobile digital audio/video recording (MDVR) system in a vehicle while a download is active, the method comprising:

identifying if a data download is currently in process and the vehicle is in an OFF powered state;

ascertaining if at least one of whether the data download is complete, and a data network connection for conducting the download is not available, and executing a shutdown of the MDVR system, otherwise;

inhibiting shut down of the MDVR system;

determining if a selected condition for maintaining the inhibiting is false and executing a shutdown of the MDVR system, otherwise;

repeating the ascertaining, inhibiting, and determining.

2. The method of claim 1 wherein the identifying includes determining that a data controller on the vehicle has established a network connection between a data container on the vehicle and a recorded media control module at a depot or station and that the vehicle is at a location where establishing the network connection is possible.

3. The method of claim 1 wherein the ascertaining a network is not available is based on a selected number of attempted connections to the data network within a predetermined duration.

4. The method of claim 3 wherein the selected number of attempted connections is up to 1000 and the predetermined duration is in a range of one minute to one hour.

5. The method of claim 1 wherein the ascertaining a network is not available is based on determining that a data rate being achieved on the data network is less than a selected threshold.

6. The method of claim 5 wherein the selected threshold is in the range of at least 1 Mb/s to 10 Mb/s.

7. The method of claim 1 wherein the inhibiting shutdown is based on an existing predetermined delay.

8. The method of claim 1 wherein the selected condition for maintaining the inhibiting includes at least one of a selected time duration from when the vehicle is powered off, and a selected time duration in addition to a preexisting delay in shutdown of the MDVR system.

9. The method of claim 1 wherein the inhibiting is prevented if the download is complete prior to a predetermined delay in shut down of the MDVR system.

10. The method of claim 9 wherein the inhibiting produces a savings of energy and bandwidth compared to a fixed shut of delay.

11. A mobile digital audio-visual recording (MDVR) system, comprising:

an audio/video (A/V) input module configured to generate media data including at least one of audio and video data a metadata interface including at least one channel configured to transfer metadata thereon; and a data collection module including at least one data container the data collection module in signal communication with the metadata interface and the A/V interface, and configured to receive the metadata and the media data, wherein the data collection module stores at least one of the metadata and the media data in the data container, wherein the data collection module is configured to execute a method of inhibiting shutdown of MDVR system in a vehicle while a download is active, the method comprising:

identifying if a data download is currently in process and the vehicle is in an OFF powered state;

ascertaining if at least one of whether the data download is complete, and a data network connection for conducting the download is not available, and executing a shutdown of the MDVR system, otherwise;

inhibiting shut down of the MDVR system;

determining if a selected condition for maintaining the inhibiting is false and executing a shutdown of the MDVR system, otherwise;

repeating the ascertaining. inhibiting, and determining.

12. The MDVR system of claim 11, wherein the metadata is at least one of vehicle identification data; braking data, acceleration data, brake pedal/accelerator pedal position data, speed data, actuator state data, voltage/current data; location data; global-positioning satellite data; digital tags, and time stamps.

13. The MDVR system of claim 11, further comprising a recorded media control module configured to process the media data stored in the second data container.

14. The MDVR system of claim 12, wherein the recorded media control module is configured to perform at least one of A/V data playback, sound adjustment, image rewind, image fast-forwarding, and image zooming.

15. The MDVR system of claim 11 further including a network connection between a data container on the vehicle and a recorded media control module at a depot or station and that the vehicle is at a location where establishing the network connection is possible.

16. The MDVR system of claim 11 wherein the ascertaining a network is not available is based on a selected number of attempted connections to the data network within a predetermined duration.

17. The MDVR system of claim 16 wherein the selected number of attempted connections is up to 1000 and the predetermined duration is in a range of one minute to one hour.

18. The MDVR system of claim 11 wherein the network is not available if a data rate being achieved on the data network is less than a selected threshold.

19. The method of claim 18 wherein the selected threshold is in the range of 1 Mb/s to 10 Mb/sec.

20. The MDVR system of claim 11 wherein the selected condition for maintaining the inhibiting include at least one of a selected time duration from when the vehicle is powered off, and a selected time duration in addition to a preexisting delay in shutdown of the MDVR system.

21. The MDVR system of claim 11 wherein the inhibiting is prevented if the download is complete prior to a predetermined delay in shut down of the MDVR system.

22. The MDVR system of claim 11 wherein the inhibiting produces a savings of energy and bandwidth compared to a fixed shut of delay.

* * * * *